US008635355B2

(12) United States Patent
Harris et al.

(10) Patent No.: US 8,635,355 B2
(45) Date of Patent: Jan. 21, 2014

(54) METHOD FOR PRE-CACHING CONTENT TO ENABLE TRUE VOD SYSTEMS FROM NVOD OR STREAM LIMITED VOD SYSTEMS

(75) Inventors: Michael Robert Harris, Phoenixville, PA (US); Ren Egawa, Wayne, PA (US)

(73) Assignee: STMicroelectronics, Inc., Coppell, TX (US)

(*) Notice: Subject to any disclaimer, the term of this patent is extended or adjusted under 35 U.S.C. 154(b) by 1615 days.

(21) Appl. No.: 10/137,613

(22) Filed: May 1, 2002

(65) Prior Publication Data

US 2003/0208612 A1    Nov. 6, 2003

(51) Int. Cl.
*G06F 15/16* (2006.01)

(52) U.S. Cl.
USPC ............ 709/231; 709/203; 709/202; 709/201

(58) Field of Classification Search
USPC .......................... 709/226, 231, 201, 202, 203
See application file for complete search history.

(56) References Cited

U.S. PATENT DOCUMENTS

| 3,996,585 | A  | * | 12/1976 | Hogan et al. ............. 345/441 |
| 5,682,597 | A  | * | 10/1997 | Ganek et al. ............. 455/3.04 |
| 5,884,141 | A  |   | 3/1999  | Inoue et al. |
| 6,308,237 | B1 | * | 10/2001 | Strongin et al. ........... 710/305 |
| 6,490,654 | B2 | * | 12/2002 | Wickeraad et al. .......... 711/133 |
| 6,707,599 | B1 | * | 3/2004  | Lu et al. ................. 359/341.41 |
| 6,801,991 | B2 | * | 10/2004 | Moller et al. .............. 711/173 |
| 6,850,691 | B1 | * | 2/2005  | Stam et al. ................ 386/68 |
| 2002/0078994 | A1 | * | 6/2002  | Ehr ........................ 137/357 |
| 2002/0087994 | A1 | * | 7/2002  | Gomez .................... 725/87 |
| 2003/0037331 | A1 | * | 2/2003  | Lee ....................... 725/32 |
| 2003/0131126 | A1 | * | 7/2003  | Cheung et al. ............. 709/238 |

FOREIGN PATENT DOCUMENTS

| EP | 0 749 242 A1 | 12/1996 |
| EP | 1 164 796 B1 | 12/2006 |
| WO | WO 01/24526 A1 | 4/2001 |

OTHER PUBLICATIONS

Communication pursuant to Article 94(3) EPC dated Oct. 13, 2011 in connection with European Patent Application No. 03 252 749.1.

* cited by examiner

*Primary Examiner* — Lan-Dai T Truong
(74) *Attorney, Agent, or Firm* — Munck Wilson Mandala, LLP

(57) ABSTRACT

Content that is delivered nearly on-demand, in overlapping streams that start in staggered intervals on different channels, is played on-demand for the user using a storage system in conjunction with the receiver. A portion of the content corresponding to the staggering interval of the various streams is pre-cached and employed for playback when the user initiates on-demand playback. Content from the most-recently-started stream at the time of playback initiation is then buffered, and playback switches from the pre-cached content to the buffered content at a preselected alignment point.

20 Claims, 3 Drawing Sheets

METHOD FOR PRE-CACHING CONTENT TO ENABLE TRUE VOD SYSTEMS FROM NVOD OR STREAM LIMITED VOD SYSTEMS

TECHNICAL FIELD OF THE INVENTION

The present invention is directed, in general, to entertainment content delivery systems and, more specifically, to entertainment content delivery systems that provide on-demand content presentation.

BACKGROUND OF THE INVENTION

Entertainment consumers are increasingly demanding instant access to entertainment content. Video-on-demand (VOD)-type systems allow consumers to view (or listen to) remotely-served content in the same manner as if the content resided on a local video tape or digital versatile disk (DVD). However, such on-demand service is very expensive for broadcast companies since large streaming servers each capable of concurrently streaming manner different streams to manner different customers is required. With satellite delivery, the problem is worse because the bandwidth to the consumer is shared across the entire service range (millions of consumers) rather than the hundreds served in equivalent (e.g., cable) systems.

As a way of offering similar capabilities, both cable and satellite companies offer near video-on-demand (NVOD), which employs a dedicated portion of bandwidth to delivery popular programs repeatedly on several channels, staggering the program starts in a carousel approach so that consumers may begin watching a program within a relatively short period of time (e.g., typically 30 minutes).

Hard disk drive-based personal video recorders (PVRs) are becoming increasingly popular, working like traditional video cassette recorders (VCRs) but recording on hard drives rather than on video tape and with a few advantages including simultaneous recording and playback, repeated use of the same recording medium with little wear, and large storage capacity. These devices are commonly employed to "time shift" programs (record of later watching), giving the same effect as local video on demand (VOD).

Typically these two systems (NVOD and PVR), which are generally utilized for different applications, are widely considered as competitive, and traditionally only one system or the other is employed, with the systems functioning together or being interoperative.

There is, therefore, a need in the art for merging near video-on-demand and personal video recorder systems to give the consumer the effect of having true on-demand content presentation.

SUMMARY OF THE INVENTION

To address the above-discussed deficiencies of the prior art, it is a primary object of the present invention to provide, for use in a content delivery and playback systems, a system in which content that is delivered nearly on-demand, in overlapping streams that start in staggered intervals on different channels, is played on-demand for the user using a storage system in conjunction with the receiver. A portion of the content corresponding to the staggering interval of the various streams is pre-cached and employed for playback when the user initiates on-demand playback. Content from the most-recently-started stream at the time of playback initiation is then buffered, and playback switches from the pre-cached content to the buffered content at a preselected alignment point.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
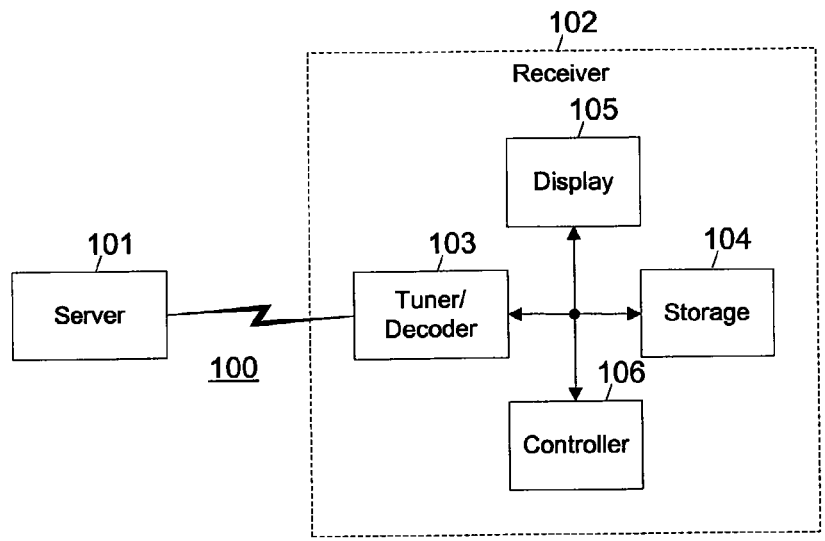
FIG. 1 depicts an entertainment content delivery and reception system employing nearly on-demand delivery and on-demand playback of entertainment content according to one embodiment of the present invention.

FIG. 1 depicts an entertainment content delivery and reception system nearly on-demand delivery and on-demand playback of entertainment content according to one embodiment of the present invention. System 100 includes a server 101 delivering content with staggered start times and in an overlapping manner on several different channels as described in further detail below. The delivered content is received at a receiver 102, which in the exemplary embodiment includes a tuner/decoder 103 capable of tuning to a number of channels, including all those on which the content is being delivered in staggered fashion, and demodulating the received content. Receiver 102 also includes a storage subsystem 104 in which received, demodulated content may be selectively stored, a display 105 or other content presentation device on which content from either tuner 103 or storage 104 may be displayed or otherwise played, and a controller 106 controlling operation of the other components.

Receiver 102 may be a television, a satellite, terrestrial or cable (digital or analog) television receiver unit, or a personal video recorder (PVR) or other recording system. In addition, receiver 102 need not necessarily include all of the components shown in a single unit. Instead, for example, the receiver 102 may be implemented by a television receiver and/or personal video recorder connected to a television, or, alternatively, a digital receiver coupled to an audio system. The delivered entertainment content need not be video content as in the exemplary embodiment, but may instead be audio content. In other embodiments, receiver 102 may be a data processing system coupled to an Internet server delivering audio content.

Those skilled in the art will recognize that that the complete structure and operation of an entertainment content delivery and reception system is not depicted or described. Instead, for simplicity and clarity, only so much of the structure and operation of an entertainment content delivery and reception system as is unique to the present invention or necessary for an understanding of the present invention is depicted and described. The remaining structure and operation may conform to current conventional practices.

Figure 2:
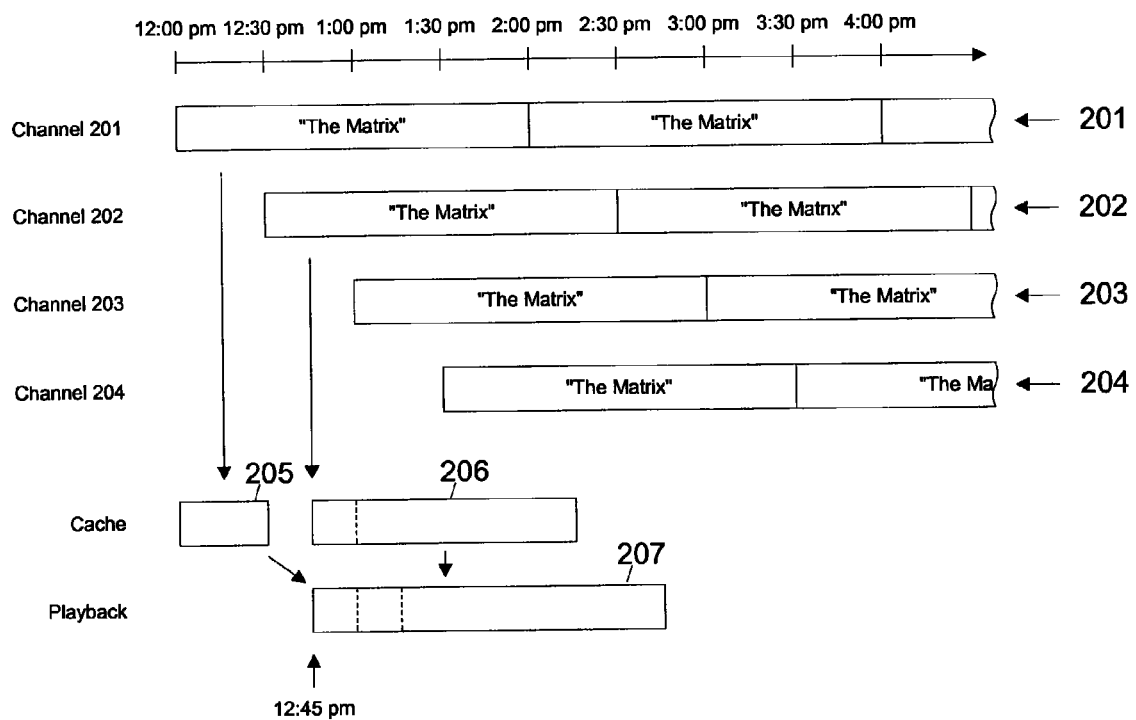
FIG. 2 depicts a timing diagram for nearly on-demand delivery and on-demand playback of entertainment content according to one embodiment of the present invention.

FIG. 2 depicts a timing diagram for nearly on-demand delivery and on-demand playback of entertainment content according to one embodiment of the present invention. In NVOD delivery systems, a particular movie ("The Matrix") is delivered in overlapping streams 201-204 on a plurality of (real or virtual) channels, staggered at thirty-minute intervals in the example shown. For example, the movies may all be delivered over a single 6 megahertz (MHz) wide channel utilizing quadrature amplitude modulation (QAM) at a data rate of approximately 18 mega bits per second (Mbps), such that each virtual channel has a bandwidth of about 4.5 Mbps.

In the present invention a portion 205 of the program is pre-cached within the storage subsystem. The selection of content to be partially cached may be based on user preferences, or may simply entail pre-caching a portion of all different content available for NVOD delivery. The size of the portion of the program that is pre-cached corresponds to the interval by which the programs are staggered (thirty minutes intervals for a two hour movie in the example shown. That is, the minimum size of pre-cached hard disk drive (HDD) space 205 for real-time VOD is at least (greater than or equal to) the number of bytes delivered during the period between start times.

When the user initiates VOD playback of the selected program, at first the cached portion 205 is played. Additionally, content from the most recently started NVOD stream (stream 202 in the example shown) is demodulated and stored in storage region 206. The point at which buffering of the most recently started stream 202 begins may be either the point at which the user initiates VOD playback (i.e., at 12:45 pm in the example shown) or the point corresponding to the video field or frame immediately following the last field or frame within cached portion 205 (i.e., at 1:00 pm in the example shown).

During VOD playback, the content selected for playback is switched from the pre-cached portion 205 to the portion 206 buffered from the most recently started stream. The switchover may occur at either the point within the content of the most recently started stream at which VOD playback was initiated by the user (e.g., the point corresponding to 12:45 pm within stream 202 in the example shown), if available, or the point corresponding to the video field or frame immediately following the last field or frame within cached portion 205 (i.e., the point corresponding to 1:00 pm within stream 202 in the example shown). For the first option, the content of the most recently started stream must have been buffered from the time at which VOD playback was initiated.

Content alignment points (e.g., the point at which on-demand playback is initiated or the point corresponding to the end of the pre-cached portion) are preselected and employed to control (a) the start of buffering from the most-recently-started NVOD stream and (b) switchover from the pre-cached portion 205 to the buffered portion 206 during playback presentation 207. While the content alignment points for the start of buffering and switchover need not coincide, the alignment point for the start of buffering must be at least as early within the program as the alignment point for switchover. Additionally, the alignment points need not correspond to the initiation of on-demand playback or the end of the pre-cache portion 205, but may alternatively be any point(s) in between.

Figure 3A:
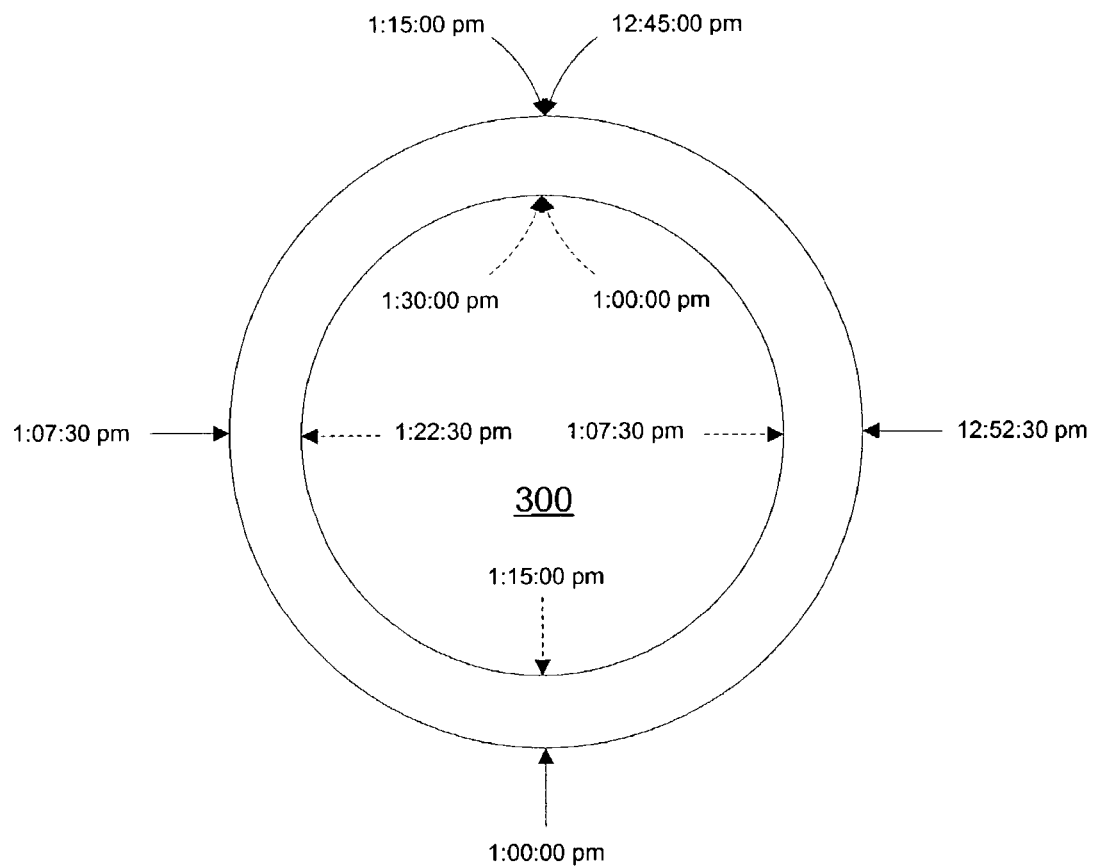
FIGS. 3A-3B illustrate different buffering configurations for nearly on-demand delivery and on-demand playback of entertainment content according to one embodiment of the present invention.
Figure 3B:
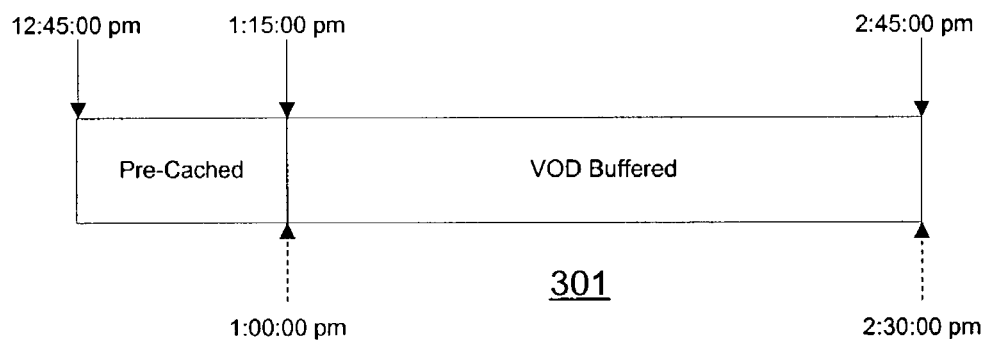

FIGS. 3A and 3B illustrate different buffering configurations for nearly on-demand delivery and on-demand playback of entertainment content according to one embodiment of the present invention. In both examples, a hard disk drive storage system utilizing read and write pointers is assumed. FIG. 3A illustrates a circular buffer 300 holding sufficient content data for playback covering the staggering interval (thirty minutes in the example). The read pointers (solid arrows) identify the locations from which content data is read at the times indicated while write pointers (dashed arrows) identify the location to which content data received at the times indicated from the most-recently-started stream is written. The buffered portion 206 is thus written over the pre-cached portion 205 within the storage. A mechanism to prevent writing over a storage location that has not yet been read may optionally be employed.

By reusing buffer storage as the content therein is consumed during playback, the amount of storage that must be dedicated to a particular program is reduced. In this embodiment, however, only VOD playback is enabled, not arbitrary time shifting (i.e., the content cannot be "rewound" past the write point within the buffer or subsequently played again in total). Additionally, once the end of the program is reached (and the program is restarted) within the most-recently-started stream, the stream must continue to be buffered for the staggering interval in order to "refresh" the pre-cached portion 205.

FIG. 3B is a linear buffer configuration 301 in which the buffered portion 206 of the content is simply written to locations logically following the pre-cached portion 205, with the read and write pointers appropriately offset by the staggering interval (i.e., thirty minutes in the example). This embodiment provides both on-demand playback and absolute, arbitrary time shifting. Mechanisms that prevent copying of the content out of the buffer except for playback and/or limiting the length of time during which the content may be retained within the buffer 301 may optionally be employed.

Figure 4:
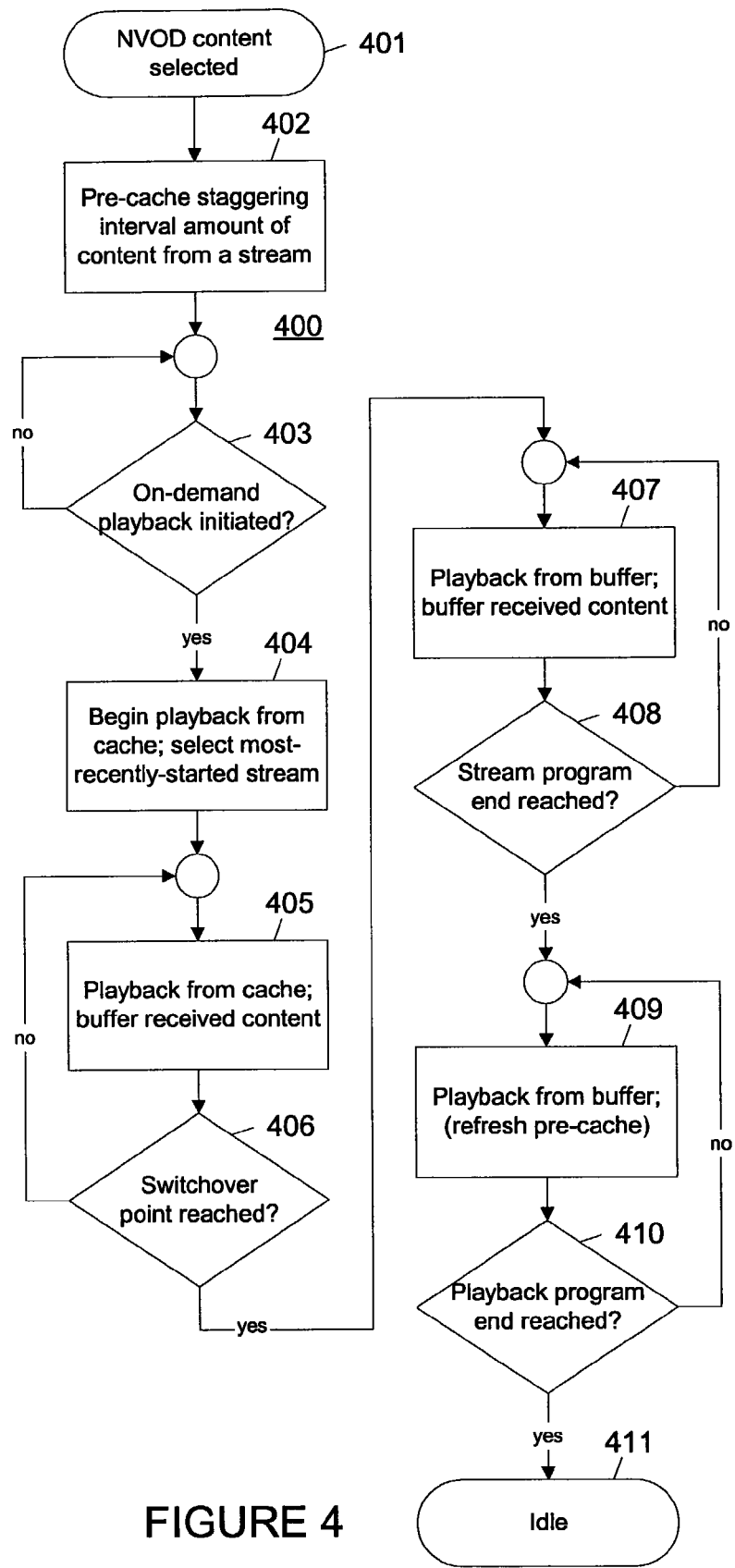
FIG. 4 is a high level flow chart for a process of providing on-demand playback of entertainment content which is delivered nearly on-demand according to one embodiment of the present invention.

FIG. 4 is a high level flow chart for a process of providing on-demand playback of entertainment content which is delivered nearly on-demand according to one embodiment of the present invention. The process 400 begins with selection of NVOD delivery content for potential on-demand playback (step 401). An amount of content data at the beginning of the selected program corresponding to the staggering interval is pre-cached (step 402). A determination is then made of whether the user has initiated on-demand playback (step 403). If not, polling for initiation of on-demand playback continues. If so, however, playback from the cache is begun and the NVOD delivery stream within which the program most recently started is selected (step 404).

Playback then proceeds utilizing the content within the cache, while the received program content data is buffered (step 405). At some predetermined point during playback, selected at least in part depending on when buffering of the most-recently-started stream is begun, playback switches over from the pre-cached portion to the buffered portion. Thus, during playback from the cache, a determination is made as to whether the switchover point has been reached (step 406). If not, playback from the cache and buffering of the received program content date continues, terminating at least as soon as all content data with the cache is consumed during playback.

Once the switchover point is reached, playback from the buffer commences (step 407), although received content continues to be buffered provided that the program end has not been reached within the most-recently-started stream (e.g., the total program duration is only twice as long as the staggering interval). During playback from the buffer and buffering of the received content, a determination is made as to whether the program end has been reached within the stream from which program content data has been buffered (step 408). If not, playback from the buffer and buffering of received program content continues.

Once the program end is reached within the stream from which program content is being buffered, playback from the buffer continues (step 409). Optionally, the pre-cached portion may be "refreshed" (if necessary) from the same stream from which program content was previously being received and buffered. Polling or monitoring for the end of the program within the buffered portion being played back is performed (step 410). Once the program has been played to completion, the process becomes idle (step 411).

Those skilled in the art will recognize that the process described above may vary, depending on user actions (e.g., "rewinding" or fast forwarding during playback of the content, or early termination of playback) or particular system configurations. The alignment points (beginning of buffering and switchover) may be indexed to program playback time or number of bytes played, and playback may proceed continuously through a logical sequence of storage addresses if buffering of received content is aligned with the pre-cached portion, either by overwriting a portion of the pre-cached program content (if buffering is begun immediately when on-demand playback is initiated) or writing the buffered program content data to storage addresses logically following the end of the pre-cache region.

The present invention enables on-demand playback of entertainment content based on nearly on-demand delivery of such content. Accessible storage is employed to pre-cache a portion of the entertainment program content corresponding to the staggering interval between successive overlapping offset streams by which the content is delivered, with an appropriate stream being selected for reception and buffering of the remainder of the program content.

It is important to note that while the present invention has been described in the context of a fully functional communications device or system, those skilled in the art will appreciate that the mechanism of the present invention is capable of being implemented and distributed in the form of a computer usable medium of instructions in a variety of forms, and that the present invention applies equally regardless of the particular type of signal bearing medium is used to carry out the distribution. Examples of suitable computer usable mediums include: nonvolatile, hard-coded or programmable type mediums such as read only memories (ROMs) or erasable, electrically programmable read only memories (EEPROMs), recordable type mediums such as floppy disks, hard disk drives, and read/write (R/W) compact disk read only memories (CD-ROMs) or digital versatile disks (DVDs), and transmission type mediums such as digital and analog communications links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for on-demand playback of content, comprising:
   a receiver configured to selectively receive each of a plurality of channels on which a program is transmitted in overlapping streams with staggered start times;
   a storage system containing a pre-cached portion of program data corresponding to playback of the program for a staggering interval between start times for the overlapping streams; and
   a controller coupled to the receiver and the storage system, the controller configured, in response to initiation of on-demand playback of the program, to:
      begin playback of the program using the pre-cached portion from a buffer starting at a point identified by a read pointer,
      select a stream having a most recent start time for the program, and
      during the playback of the program, write program data from the selected stream into the buffer starting at a location identified by a write pointer, wherein the write pointer is separated from the read pointer by an amount of program data based on at least one of the staggering interval and a start time of the selected stream, wherein playback using the pre-cached portion terminates at a first storage location in the buffer and playback using program data from the selected stream begins at a point within the program data corresponding to a second storage location in the buffer, wherein the first and second storage locations are successive storage locations in the buffer.

2. The system according to claim 1, wherein buffered program data from the selected stream begins at a program point immediately following a point corresponding to an end of the pre-cached portion.

3. The system according to claim 1, wherein the controller is configured to begin playback of buffered program data from the selected stream upon completing playback of the pre-cached portion.

4. The system according to claim 1, wherein buffered program data from the selected stream begins at a program point prior to a point corresponding to an end of the pre-cached portion.

5. The system according to claim 1, wherein a set of logically successive storage locations forming the buffer comprises a circular buffer, wherein buffered program data from the selected stream is written over the pre-cached portion.

6. The system according to claim 1, wherein a set of logically successive storage locations forming the buffer comprises a linear buffer.

7. The system according to claim 1, wherein the pre-cached portion is refreshed from the selected stream.

8. A system for on-demand playback of content delivered nearly on-demand, the system comprising:
   a server configured to transmit a program in overlapping streams with staggered start times on each of a plurality of channels;
   a receiver configured to selectively receive each of the plurality of channels;
   a storage system containing a pre-cached portion of program data corresponding to playback of the program for a staggering interval between start times for the overlapping streams;
   a presentation device configured to selectively present playback of program content from either the receiver or the storage system; and
   a controller configured, in response to initiation of on-demand playback of the program, to:
      begin playback on the presentation device of the program using the pre-cached portion from a buffer starting at a point identified by a read pointer,
      select a channel at the receiver on which a stream having a most recent start time for the program is being transmitted, and
      during the playback of the program, write program data from the selected channel into the buffer starting at a location identified by a write pointer, wherein the write pointer is separated from the read pointer by an amount of program data based on at least one of the staggering interval and a start time of the selected stream, wherein playback using the pre-cached portion terminates at a first storage location in the buffer and playback using program data from the selected stream begins at a point within the program data corresponding to a second storage location in the buffer, wherein the first and second storage locations are successive storage locations in the buffer.

9. The system according to claim 8, wherein buffered program data from the selected stream begins at a program point immediately following a point corresponding to an end of the pre-cached portion.

10. The system according to claim 8, wherein the controller is configured to begin playback of buffered program data from the selected stream upon completing playback of the pre-cached portion.

11. The system according to claim 8, wherein buffered program data from the selected stream begins at a program point prior to a point corresponding to the end of the pre-cached portion.

12. The system according to claim 8, wherein a set of logically successive storage locations forming the buffer comprises a circular buffer, and wherein buffered program data from the selected stream is written over the pre-cached portion.

13. The system according to claim 8, wherein a set of logically successive storage locations forming the buffer comprises a linear buffer.

14. The system according to claim 8, wherein the pre-cached portion is refreshed from the selected stream.

15. A method of on-demand playback of content delivered nearly on-demand, the method comprising:
   for a program received at a receiver in overlapping streams with staggered start times on each of a plurality of channels, pre-caching, a portion of the program corresponding to playback of the program for a staggering interval between start times for the overlapping streams; and
   upon initiation of on-demand playback of the program, causing a controller:
      to begin playback of the program from the storage system using the pre-cached portion from a buffer starting at a point identified by a read pointer,
      to select a stream having a most recent start time for the program, and
      during the playback of the program, to write program data from the selected stream into the buffer starting at a location identified by a write pointer, wherein the write pointer is separated from the read pointer by an amount of program data based on at least one of the staggering interval and a start time of the selected stream, to terminate playback using the pre-cached portion at a first storage location in the buffer and to begin playback using program data from the selected stream a point within the program data corresponding to a second storage location in the buffer, wherein the first and second storage locations are successive storage locations in the buffer.

16. The method according to claim 15, wherein the buffered program data from the selected stream begins at a program point immediately following a point corresponding to the end of the pre-cached portion.

17. The method according to claim 15, further comprising:
   beginning playback of buffered program data from the selected stream upon completing playback of the pre-cached portion.

18. The method according to claim 15, wherein the buffered program data from the selected stream begins at a program point prior to a point corresponding to the end of the pre-cached portion.

19. The method according to claim 15, further comprising:
   storing the pre-cached portion and buffered program data from the selected stream within a circular buffer, wherein the buffered program data from the selected stream is written over the pre-cached portion.

20. The method according to claim 15, further comprising:
   storing the pre-cached portion and buffered program data from the selected stream within a linear buffer.

* * * * *

UNITED STATES PATENT AND TRADEMARK OFFICE
CERTIFICATE OF CORRECTION

| | | |
|---|---|---|
| PATENT NO. | : 8,635,355 B2 | Page 1 of 1 |
| APPLICATION NO. | : 10/137613 | |
| DATED | : January 21, 2014 | |
| INVENTOR(S) | : Harris et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1806 days.

Signed and Sealed this
Twelfth Day of April, 2016

Michelle K. Lee
*Director of the United States Patent and Trademark Office*